United States Patent [19]

Kaneko

[11] 4,329,039
[45] May 11, 1982

[54] SHUTTER RELEASE APPARATUS

[75] Inventor: Hirokazu Kaneko, Kawasaki, Japan

[73] Assignee: Ricoh Company, Ltd., Tokyo, Japan

[21] Appl. No.: 163,419

[22] Filed: Jun. 27, 1980

[30] Foreign Application Priority Data

Jun. 25, 1979 [JP] Japan .................. 54-079928

[51] Int. Cl.³ .............................. G03B 17/38
[52] U.S. Cl. ...................... 354/266; 354/267
[58] Field of Search ................. 354/266, 267

[56] References Cited

U.S. PATENT DOCUMENTS

| 3,599,548 | 8/1971 | Hennig | 354/266 |
| 3,603,228 | 9/1971 | Kremp et al. | 354/266 |
| 3,950,273 | 4/1976 | Winkler et al. | 354/266 |

FOREIGN PATENT DOCUMENTS

| 1941751 | 3/1978 | Fed. Rep. of Germany | 354/266 |
| 1911792 | 7/1978 | Fed. Rep. of Germany | 354/266 |
| 54-105536 | 8/1979 | Japan | 354/266 |

Primary Examiner—Russell E. Adams
Attorney, Agent, or Firm—Wyatt, Gerber, Shoup, Scobey & Badie

[57] ABSTRACT

A shutter release apparatus in a camera comprises an insulating holding member which holds electroconductive contacts and which can be deformed elastically by depression of a shutter release button, a first electroconductive contact fixed to the insulating holding member, which comprises a plurality of contact members which are positioned in different planes, and a second electroconductive contact formed in a circuit printed board disposed below the holding member, the second electroconductive contact comprising a plurality of contact members which constitute sequentially a plurality of switches in contact with each of the contact members of the first electroconductive contact in the course of depression of the shutter release button with elastic deformation of the holding member.

4 Claims, 3 Drawing Figures

SHUTTER RELEASE APPARATUS

BACKGROUND OF THE INVENTION

The present invention relates to a shutter release apparatus operated by a shutter release button in a camera.

As an improvement on conventional mechanical release mechanisms, there is known a method whereby depression of a shutter release button closes an electrical switch allowing the energizing of an electromagnetic device, which releases the camera's shutter. There are also known means whereby, in conjunction with the operating of such a mechanism, electrical switching may be provided for the operation of an overall or general power-related system, such as for automatic exposure control. Such switching may precede the activation of the electromagnetic release device.

For example, there is known a system whereby a vertical rod member on the axis of the shutter release button moves downwards with the depression of the button. Extending horizontally from the surface of the rod member are multiple protrusions which move downwards with the rod member and, by simple mechanical force, serve to push closed or open various spring switches disposed in their paths.

Similarly, there is known a system whereby the shutter release button with a rod member as above moves downwards within a sleeve which is also movable vertically. Means are provided whereby, after a predetermined amount of vertical travel, the shutter release button engages the movable sleeve which itself also then moves downwards. The rod member serves to operate one electrical switch while the movable sleeve serves to operate another. In the shutter release mechanism, the operational timing of each switch is set different, so that, for example, a switch which is turned on earlier is employed as a main switch for activation of the shutter release mechanism while another switch which is turned on with a certain time lag thereafter is employed as a switch for activating a magnetic release device.

However, in both of the foregoing examples, a large number of parts are required and sequential timing is determined by physical separation of the moving members and is relatively difficult to predetermine with the necessary accuracy, particularly requiring delicate adjustment of the stroke of the release button and the sequential operation of a first switch and a second switch. As a result, considerable effort and expense to manufacture are required.

In addition, they both require a relatively large space within the camera body because of the various protrusions and mechanical spring switches required, and both leave the most delicate parts thereof open and susceptible to the effects of dust and moisture.

SUMMARY OF THE INVENTION

It is therefore an object of the present invention to provide a shutter release apparatus capable of initiating mulitple functions sequentially, without the drawbacks of the known systems, particularly to provide a shutter release apparatus whose parts are reduced in number in comparison with the conventional systems and which does not require adjustment of the stroke of the shutter release button and of the operational timing of the switches contained in the shutter release apparatus during or after the manufacturing process.

Another object of the invention is to provide a shutter release apparatus which requires a relatively small space around the shutter release button required for the mechanism.

A further object of the invention is to provide a shutter release apparatus capable of maintaining its performance with high durability and no susceptibility to the adverse effects of dust and other ambient factors.

A feature of the invention is that there is provided an electrically insulating member for holding electrical contacts, which is elastic and can be deformed when a shutter release button is depressed, and that a first switch contact is fixed to the holding member and, below the first switch contact, there is provided a second switch contact, so that when the shutter release button is depressed, the holding member is deformed in such a manner that the first contact is brought into contact with the second contact.

According to the invention, a contact which constitutes one contact of the shutter release switch is fixed to the elastic holding member and by deforming the holding member during the shutter release operation, the counterpart of the shutter release switch is caused to come into contact with its counterpart contact, thereby switching is accomplished. Because the two principle items comprising the shutter release apparatus according to the invention are manufactured as integral units, once manufactured no adjustment thereof is necessary in order to achieve the desired accuracy of functioning. In addition, in comparison with the other known systems, the required space around the release button is relatively small, and susceptibility to the adverse effects of dust and moisture is slight since those contact portions are surrounded by the contact holding members and a circuit printed boards. Furthermore, the switch contacts can be formed in the circuit printed board with the desired print patterns. For instance, multiple contact portions can be easily prepared with parallel connections. Therefore, according to the invention, shutter release buttons with high reliability can be provided.

DETAILED DESCRIPTION OF THE PREFERRED EMBODIMENT

Figure 1:
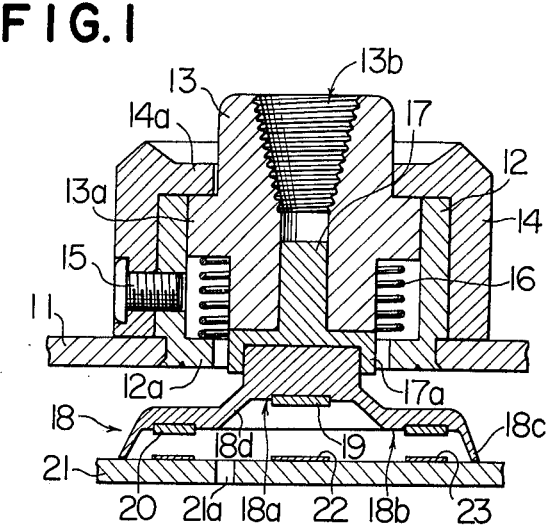
FIG. 1 shows a cross section of an embodiment of a shutter release apparatus according to the invention.

FIG. 1 shows the normal state of an embodiment of a shutter release apparatus according to the invention. In FIG. 1, a cylindrical guide base 12 with a lower flange portion 12a formed in an inward direction is tightly fitted into a hole in a plate 11, which constitutes a portion of the outer body of a camera. Surrounding the guide base 12 is a cylindrical release-button shell 14, with a flange portion 14a formed in an inward direction, such that the flange portion 14a extends inwardly across the top of the guide base 12. The releasebutton shell 14 is fastened to the guide base 12 by means of a screw 15 inserted radially through the two cylindrical portions 14 and 12.

Disposed within the guide base 12 is a cylindrical shutter release button 13, with a flange portion 13a formed in an outward direction, such that the outer surface of the flange portion 13a is in contact with the inner surface of the guide base 12. The shutter release button 13 thus may be moved vertically within the cylinder of the guide base 12, guided therein by the sliding contact between the flange portion 13a and the inner surface of the guide base 12. Disposed around shutter release button 13, below the flange portion 13a, is a coil spring 16. The resilience of the coil spring 16 causes it to press against the flange portion 13a of the shutter release button 13, and against the flange portion 12a of the guide base 12, giving the shutter release button 13 a movement bias in the upward direction. The limit of this upward movement of the shutter release button 13 is the contact between the upper surface of the flange portion 13a thereof and the lower surface of the flange portion 14a of the release button shell 14.

In the upper portion of the shutter release button 13, a conical opening 13b is formed, tapering inward in the downward direction, and threaded around its inner surface for the attachment of a standard cable release. At the bottom of the contact opening 13b, continuing downward with a diameter equal to the smallest diameter of the conical opening 13b is a further cylindrical channel to the bottom of the shutter release button 13. Within the cylindrical channel is a shaft 17 which is slidable within the channel and which, in the lower portion 17a thereof, is of a greater diameter equal to the diameter of the lowest portion of the shutter release button 13, thus limiting the upward movement of the shaft 17 in the channel.

In the buttom surface of the shaft 17, in portion 17a thereof, a cylindrical depression is cut, and therein is fitted the upper portion of an electrical contact holding member 18. The electrical contact holding member 18 is attached to the shaft 17 by an adhesive agent.

The electrical contact holding member 18 is flexible and elastic, and is formed from an electrically non-conductive material. The basic shape of the holding member 18 is that of a terraced, inverted flower pot, as shown in FIG. 1, surfaces 18a, 18b thereof being horizontal and in different planes. Referring to FIG. 1, portions 18c, 18d of the holding member 18 are formed such that the portion 18c is relatively thin in comparison with the portion 18d, allowing the former to be more easily flexed.

On the surface 18a of the holding member 18 is disposed an electrically conductive rubber plate 19. Along the cylindrical surface 18b of the holding member 18 is disposed an electrically conductive rubber partial-ring 20, in the shape of a "C". Below the holding member 18 is disposed a contact board 21, such that the portion 18c of the holding member 18 is in light contact therewith in the normal state of the shutter release mechanism, as shown. In the contact board 21, below the plate 19, is disposed a print pattern 22, which comrises an electrical switch in conjunction with the plate 19. Also in the contact board 21, below the partial-ring 20, is disposed a print pattern 23, which comprises an electrical switch in conjunction with the partial-ring 20. Within the contact board 21 is also formed a hole 21a, for the purpose of allowing air to pass therethrough.

In the normal state of the shutter release mechanism as shown in FIG. 1, the two electrical switches 19-22 and 20-23 are open. When the shutter release button 13 is depressed against the force of the spring 16, causing the shaft 17 to press downward upon the holding member 18 (in, in the case of a cable release when the shaft 17 is depressed by the cable release; hereinafter the same), the electrical contact holding member 18 "collapses" to a state shown approximately in FIG. 3, allowing contact between the print pattern 22 and the plate 19, and between the print pattern 23 and the partial ring 20, closing the two aforesaid switches formed thereby. When the shutter release button 13 is released (or the cable release is released or unlocked; hereinafter the same), the resilience of the holding member 18 returns this portion of the mechanism to its normal state.

Figure 2:
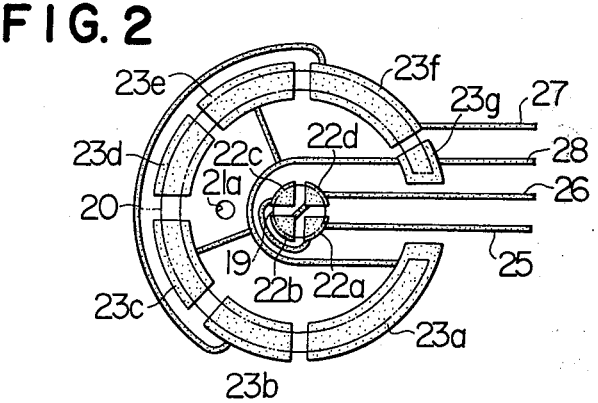
FIG. 2 shows a plan view of an example of a printed pattern which constitutes switch contacts in the embodiment shown in FIG. 1.

The print patterns 22, 23 are more particularly shown in FIG. 2. The print button 22 comprises four pie-shaped portions 22a, 22b, 22c and 22d, arranged in a circular pattern with a predetermined space between. Furthermore, the portions 22a, 22c are electrically connected to each other, and the portions 22b, 22d are electrically connected to each other, by printed circuit. The portions 22a/22c and 22b/22d are respectively connected to printed electrical connections 25, 26.

The print pattern 23 comprises seven arc-shaped portions 23a, 23b, 23c, 23d, 23e, 23f and 23g, arranged in a partial ring, circular pattern, concentric with the circular pattern of print pattern 22, with a predetermined space between. Furthermore, the portions 23a, 23c, 23e and 23g are electrically connected to each other, and portions 23b, 23d and 23f are electrical connected to each other, by printed circuit. The portions 23a/23c/23e/23g and 23b/23d/23f are respectively connected to printed electrical connections 28, 27.

When the shutter release button 13 is depressed as described above, the downward movement of the shaft 17 causes the deformation of the flexible holding member 18 to begin first at the thinnest portion thereof, i.e., the portion 18c. Such deformation in accordance with the downward movement first causes the partial ring 20 to come into contact with the printed pattern 23, thus closing the switch formed thereby, and allowing electric current to pass along the circuit comprising the printed electrical connections 27, 28. Sufficient for closing the switch is contact between partial ring 20 and any of segments 23a, 23c, 23e and 23g together with contact between partial ring 20 and any of segments 23b, 23d and 23f.

Further downward movement of the shaft 17, as the shutter release button 13 is depressed, then causes deformation of the holding member 18 in the portion 18d thereof. Such deformation in accordance with the downward movement causes the plate 19 to come into contact with the printed pattern 22, thus closing the switch formed thereby, and allowing electric current to pass along the circuit comprising the printed electrical connections 25, 26. Sufficient for closing the switch is contact between the plate 19 and either of portions 22a or 22c, together with either of portions 22c or 22d.

Figure 3:
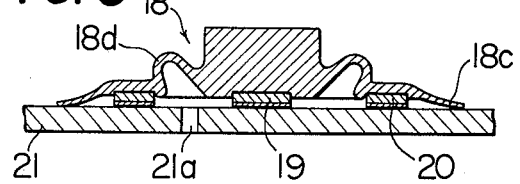
FIG. 3 shows a cross section of the main portion of the shutter release apparatus of FIG. 1 when a release button is depressed.

The final closed state of the two aforesaid switches is approximately depicted in FIG. 3. But as indicated by the discussion above, the switch 20-23, to which the printed electrical connections 27, 28 are connected, is closed first, followed by the closing of the switch 19-22, to which printed electrical connections 25, 26 are connected. This allows the former switch to be utilized in the activation of any of a variety of overall or general power-related systems, such as for automatic exposure control, which must be activated first; and for the latter switch to be utilized for the initiation of the actual shutter-tripping operation, such as by electromagnetic means.

When the shutter release button 13 is released as described above, the spring 16 returns to its normal position. At the same time, the resilience of the flexible holding member 18 returns the holding member 18 to its normal state, thereby first opening switch 19-22 and thereafter switch 20-23. The aforementioned hole 21a in contact board 21, by allowing the free passage of air therethrough, serves to prevent any "suction cup" effect from occurring between the holding member 18 and contact board 21, and thereby facilitates the smooth operation of this portion of the mechanism.

What is claimed is:

1. A shutter release apparatus in a camera, said camera having a camera body and a shutter for controlled exposure of film, comprising:
    a shutter release button having a normal position not operative of the shutter and an operative position which operates the shutter, mounting means to mount the shutter release button to the camera body and permit sliding motion of said button upon operation from its normal to its operative position, spring means connected to said mounting means to return said shutter release button to its normal position after the shutter release button is released;
    an insulative deformable elastic holding member having an inner face and an outer face, a central portion and a skirt portion;
    a central electroconductive contact fixed to said central portion of the inner face of said holding member, a skirt electroconductive contact fixed to said skirt portion of the inner face of said holding member;
    an insulative board mounted on the camera body and having a face facing but separated from the central contact and the skirt contact of the holding member, an inner electroconductive contact fixed to said board and aligned with and normally spaced from said central contact, an outer electroconductive contact fixed to said board and aligned with and normally spaced from said skirt contact;
    means connecting said shutter release button to said holding member so that movement of said shutter button from normal to operative positions causes, in sequence, closure of the skirt contact with the outer contact and then closure of the central contact with the inner contact.

2. A shutter release apparatus as in claim 1 wherein the skirt portion of the holding member is in sliding contact with said insulative board.

3. A shutter release apparatus as in claim 1 wherein said holding member is generally cup-shaped.

4. A shutter release apparatus as in claim 1 wherein cross-sections taken through said holding member perpendicular to its direction of movement is a series of rings at its skirt portion and a series of discs at its central portion.

* * * * *